United States Patent
Pacini et al.

(10) Patent No.: US 9,964,711 B1
(45) Date of Patent: May 8, 2018

(54) OPTICAL CABLE FOR AVIONICS APPLICATIONS, METHOD OF MANUFACTURE THEREOF AND ARTICLES COMPRISING THE SAME

(71) Applicant: OFS Fitel, LLC, Norcross, GA (US)

(72) Inventors: John E Pacini, Glastonbury, CT (US); Brian Violette, East Granby, CT (US)

(73) Assignee: OFS FITEL, LLC, Norcross, GA (US)

( * ) Notice: Subject to any disclaimer, the term of this patent is extended or adjusted under 35 U.S.C. 154(b) by 0 days. days.

(21) Appl. No.: 15/474,099

(22) Filed: Mar. 30, 2017

(51) Int. Cl.
*G02B 6/36* (2006.01)
*G02B 6/38* (2006.01)
*G02B 6/44* (2006.01)

(52) U.S. Cl.
CPC ......... *G02B 6/3869* (2013.01); *G02B 6/4415* (2013.01); *G02B 6/4429* (2013.01); *C03C 2213/00* (2013.01); *G02B 6/3874* (2013.01)

(58) Field of Classification Search
CPC .. G02B 6/3869; G02B 6/3874; G02B 6/4415; G02B 6/4427; G02B 6/4429; G02B 6/4486
USPC ................ 385/78, 80, 86, 87, 100, 102, 109
See application file for complete search history.

(56) References Cited

U.S. PATENT DOCUMENTS

| 5,058,984 A * | 10/1991 | Bulman et al. ...... | G02B 6/3869 385/80 |
| 5,621,836 A * | 4/1997 | Schofield et al. ... | G02B 6/3861 385/76 |
| 2009/0245739 A1* | 10/2009 | Kamps et al. ....... | G02B 6/4486 385/102 |
| 2013/0148927 A1* | 6/2013 | Chen et al. .......... | G02B 6/3878 385/50 |

* cited by examiner

*Primary Examiner* — Robert Tavlykaev
(74) *Attorney, Agent, or Firm* — David E. Rodrigues

(57) ABSTRACT

Disclosed herein is an optical cable connection comprising a buffer sleeve having an inner portion and an outer portion; where the inner portion comprises an optical core that is operative to transmit light; and a tight buffer layer disposed on the core; where the buffer sleeve is trimmed back at its end to provide an exposed protruding length of the tight buffer layer with the core included therein; where the outer portion of the buffer sleeve is configured to form a socket that is operative to receive a connector ferrule; where the connector ferrule comprises; an annular tubular plug having a center opening; where the annular tubular plug mates with the socket formed in the outer portion of the buffer sleeve; a ferrule seated in the plug; where the ferrule receives the exposed protruding length of the tight buffer layer that extends axially outwardly from the buffer sleeve into the center opening of the ferrule.

17 Claims, 12 Drawing Sheets

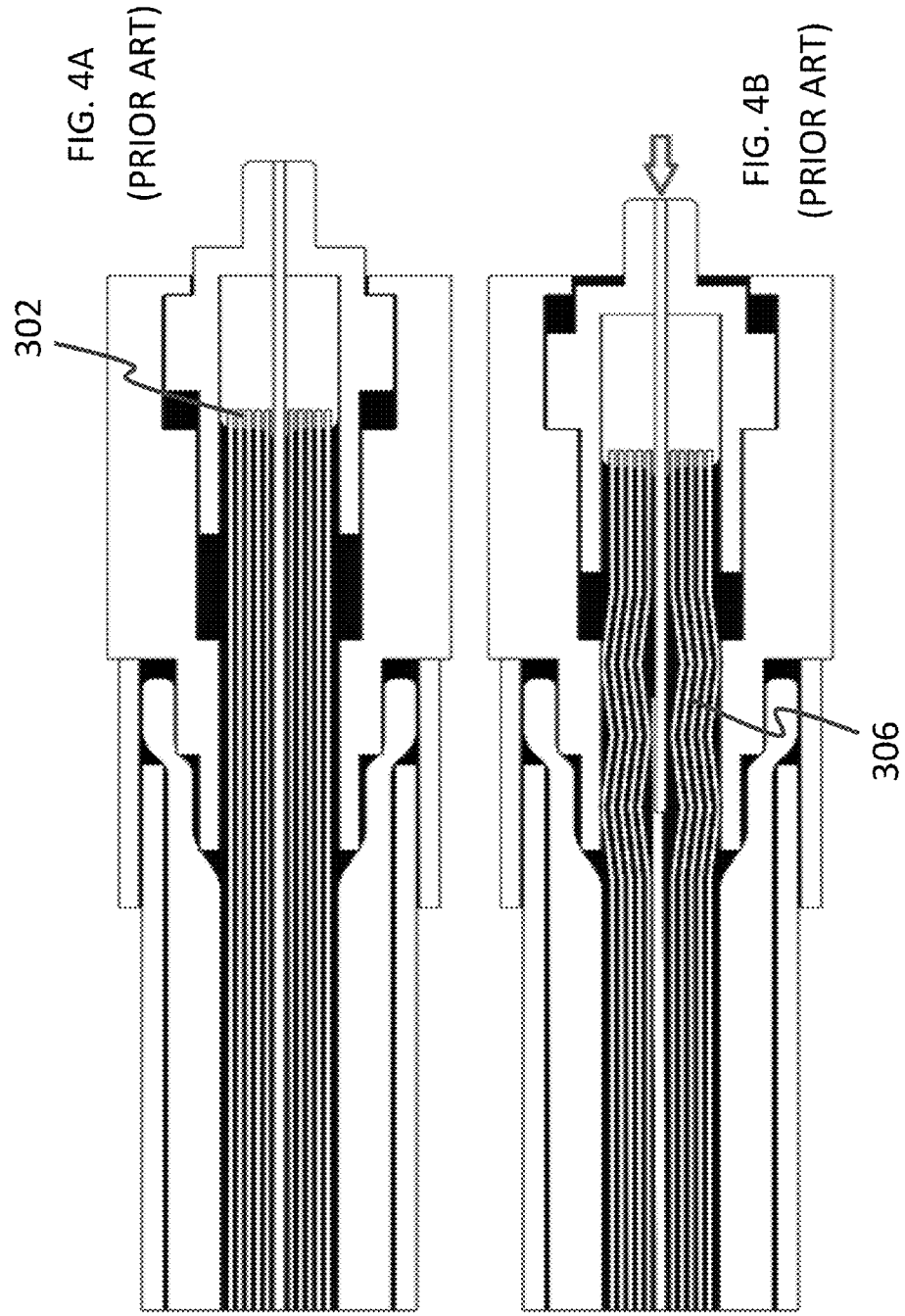

FIG. 6 (side view)

OPTICAL CABLE FOR AVIONICS APPLICATIONS, METHOD OF MANUFACTURE THEREOF AND ARTICLES COMPRISING THE SAME

BACKGROUND

Disclosed herein is an optical cable for avionics applications, methods of manufacture thereof and articles comprising the same. More specifically, disclosed herein is an optical cable connection for use in avionics applications, methods of manufacture thereof and articles comprising the same.

Optical fibers used in optical applications generally have to meet the requirements of ARINC (Aeronautical Radio, Incorporated) 802. ARINC 802 provides specifications that cover the performance requirements, dimensions, quality assurance criteria, test procedures, and cable codification for fiber optic cables that are suitable for use in commercial aircraft. In order to meet the requirements of ARINC 802, a ruggedized simplex loose tube structured cable is used.

FIG. 1 depicts a cross-section of a cable connection 100 used in installations where resistance to cable clamping and resistance to cable elongation loads are desirable. The ruggedized simplex loose tube structure cable 100 comprises an unbuffered optical fiber 102 upon which is disposed a cladding 103 and a soft, loose buffer sleeve 104 (hereinafter buffer sleeve 104). The buffer sleeve 104 generally comprises a polymeric material. In comparative commercially available optical cables, the buffer sleeve 104 generally comprises a soft polytetrafluoroethylene (PTFE) tape loose buffer within which the optical fiber 102 with the cladding 103 disposed thereon can flex when subjected to compressive forces.

A first reinforcing layer (also termed a first strength member layer) 106, an inner jacket 108, a second reinforcing layer (also termed a second strength member layer) 110 and an outer jacket 112 are disposed in succession on the buffer sleeve 104. The first and second reinforcing layers generally comprise woven fibrous yarns in order to provide strength and reinforcement to these layers.

The use of the second reinforcing layer and the second outer jacket increase the cable diameter and weight. Optical cables of this configuration typically have an outer diameter of 2.85 millimeters and a weight of 12 kg/km. It is desirable to avoid this increase in size and weight for the cable. Moreover, the polymer material selected for the buffer sleeve has to be soft to allow for longitudinal compression of the tube when a spring loaded ferrule of the connector is compressed when mated to system components.

FIG. 2 depicts a side view of a portion of the end of the cable 100 of the FIG. 1 with a pull-proof connector 118 that is used in avionics applications. The pull-proof connector 118 is generally fitted with a ceramic ferrule (shown and detailed in the FIGS. 3A and 3B below). In the FIG. 1, a portion of a cable 100 comprising the unbuffered optical fiber 102 is in communication with the pull-proof connector 118. The pull-proof connector 118 comprises a socket 116 into which fits the ceramic ferrule (shown in the FIGS. 3A and 3B). The pull-proof connector may be formed by the portions of the cable that lie outside of the soft, loose buffer sleeve 104.

FIG. 3A depicts the ceramic ferrule 200 that is part of the pull-proof connector 118 in a non-compressed position, while the FIG. 3B depicts the ceramic ferrule 200 in a compressed position.

The ceramic ferrule 200 shown in the FIG. 3A comprises a male connector annular plug 202 (hereinafter plug 202) that mates with the socket 116 to form the pull-proof connector 118. The annular plug 202 comprises a guide tube portion 210 that fits around the outer jacket of the optical cable 100. The guide tube portion serves as a location element for positioning the plug to be annular with the optical cable 100. Disposed in the plug 202 is a ferrule 206 that contains a first hollow portion 204 that accommodates the buffer sleeve 104. In the first hollow portion 204, it may be seen that a portion of the optical fiber is unsupported by the buffer sleeve 104. The head of the ferrule 206 comprises a second hollow portion that accommodates the optical cable 102. An epoxy plug 208 encapsulates the optical fiber at the point that it enters the second hollow portion 205 of the ferrule that accommodates the optical cable 102. The epoxy plug 208 behaves as a sealant.

The portion of the optical fiber is unsupported by the buffer sleeve 104 occurs because assembly manufacturers encounter difficulties in right-sizing the current simplex loose structure cable. Specifically, the buffer sleeve must contact the bottom of the male connector plug 202 where the ceramic ferrule is located as shown in FIG. 3A. However, it is not always possible to size the buffer sleeve accurately to precisely contact the bottom of the male connector plug 202 in the compressed position.

In the non-compressed position depicted in the FIG. 3A, a portion of the ferrule 206 protrudes outside the plug 202 while the first hollow portion 204 accommodates the buffer sleeve 104 and the second hollow portion 205 accommodates the optical fiber 102 without any significant stresses on either the buffer sleeve 104 or the optical fiber 102.

In the compressed position depicted in the FIG. 3B, the ferrule 206 is pressed into the plug 202. During the compression or thereafter, the optical fiber 102 sometimes undergoes buckling 211 in the unsupported portion because of compressive stresses. It has been observed that the optical fiber 102 will often undergo buckling and break if not protected by the buffer sleeve 104 when the ferrule 206 is compressed and decompressed during connection to system components.

In addition, during compression, the epoxy plug 208 often contacts the buffer sleeve 104 and wicks into it upon contact. FIG. 4A depicts the wicking 302 of the epoxy plug into the buffer sleeve 104. Once the epoxy enters the buffer sleeve 104 and bonds the coated optical fiber to the buffer sleeve 104, movement of the coated optical fiber within the buffer sleeve 104 is inhibited, resulting in a high stress level that frequently leads to optical fiber breakage.

In the FIG. 4B, kinking 306 of the buffer sleeve is observed within the connector body as the spring loaded ferrule retracts. The spring loaded ferrule is designed to retract a minimum of 1.5 mm and the simplex buffer sleeve buffered cable must take up or compensate this retraction (compression of spring loaded ferrule) without breakage of the optical fiber, repeatedly, many times over the life of the terminated cable assembly. The kinking of this soft buffer sleeve, required to protect the coated optical fiber, results in frequent fiber breaks at this point of kinking. Also, because the buffer sleeve is soft, the strength member yarns radially compress the tube as they move to the center of the cable structure when under load. This results in excessive cable elongation under cable tensile load, causing additional fiber breakage.

It is therefore desirable to manufacture optical cables for avionics applications that do not suffer from the aforementioned drawbacks.

SUMMARY

Disclosed herein is an optical cable connection comprising a buffer sleeve having an inner portion and an outer portion; where the inner portion comprises an optical core that is operative to transmit light; and a tight buffer layer disposed on the coated optical fiber core; where the buffer sleeve is trimmed back at its end to provide an exposed protruding length of the tight buffer layer with the core included therein; where the outer portion of the buffer sleeve is configured to form a socket that is operative to receive a connector ferrule; where the connector ferrule comprises; an annular tubular plug having a center opening; where the annular tubular plug mates with the socket formed in the outer portion of the buffer sleeve; a ferrule seated in the plug; the ferrule having a first end and a second end; where the first end receives the exposed protruding length of the tight buffer layer that extends axially outwardly from the elongated buffer sleeve into the center opening of the ferrule; where the second end has a center opening that receives the optical core; and a polymeric plug that is disposed at the second end of the plug and that surrounds the tight buffer layer that point that it contacts the ferrule; where a closest end of the buffer sleeve is separated from the first end of the ferrule by a distance of 10 millimeters or greater.

Disclosed herein too is a method comprising disposing in a buffer sleeve an optical fiber that is operative to transmit light; where the buffer sleeve comprises an inner portion that contains the optical fiber and an outer portion that comprises a first reinforcing layer; where the first reinforcing layer is formed into a socket at an end of the buffer sleeve; trimming a portion of the buffer sleeve to expose a portion of a tight buffer layer that is disposed on an optical core; disposing a ferrule connector comprising an annular tubular plug and a ferrule; such that a protruding portion of the annular tubular plug mates with the socket; the annular tubular plug and the ferrule each having a central opening to accommodate the exposed portion of the tight buffer layer; where the tight buffer layer extends axially outwards from the buffer sleeve to an inner surface of the ferrule and where the optical core is secured by the ferrule; and pressing the connector ferrule into the annular tubular plug where an end portion of the trimmed buffer sleeve is located at a distance of 10 millimeters or greater from a nearest surface of the ferrule.

BRIEF DESCRIPTION OF THE FIGURES

FIG. 4A depicts the wicking of the epoxy plug into the buffer sleeve;

FIG. 4B depicts kinking of the buffer sleeve that is observed within the connector body as the spring loaded ferrule retracts;

DETAILED DESCRIPTION

Disclosed herein is a simplex loose structure cable for use in avionics applications using a tight buffered optical fiber and a high crush resistant buffer sleeve. The tight buffer on the coated optical fiber provides additional protection and strength to the optical fiber as it retracts within the buffer sleeve when the spring loaded ferrule is compressed a minimum of up to 1.5 millimeters.

The buffer sleeve comprises a high crush resistant material and is designed to provide significantly improved crush resistance of the cable when compressed or crimped to allow free movement of the tight buffered optical fiber inside it. Since this buffer sleeve does not collapse under radial compressive forces, the cable will maintain its shape and form when the cable is under a radial compressive load. In addition, the strength member yarns do not collapse on to the fiber directly any more when the cable is stretched as the buffer sleeve isolates the tight buffered optical fiber from its surrounding, thereby allowing the cable to meet the Cable Clamping and the Finished Cable Tensile Strength and Elongation specifications of ARINC 802.

The outer diameter of the buffer sleeve allows the sleeve to fit precisely within the shell of the connector ferrule, eliminating aramid yarns from the termination process, as shown in the figures below. By keeping the buffer sleeve away from contacting the body of the connector, away from the point at which the optical fiber is bonded to the ferrule, epoxy cannot wick into the tube, thus eliminating the unintended bond between the buffered fiber and the buffer sleeve thus assuring free movement of the buffered fiber within the buffer sleeve during compression of the ferrule.

Disclosed herein too is an optical cable connector that comprises a socket formed from the outer portions of the cable that lie external to the annular buffer sleeve. A connector ferrule comprising a plug and a ferrule is in communication with the socket. The plug and the ferrule are annular to the buffer sleeve. The plug and the ferrule both have a central passage for receiving the optical fiber. In this design, the buffer sleeve is stripped back so as not to contact the ferrule. A portion of a tight buffer layer with the enclosed optical core extends from the stripped buffer sleeve to travel through the central passage in the plug and the ferrule to contact an epoxy plug located in the ferrule. The optical core is secured in the ferrule. The presence of the buffer layer on the optical core prevents the core from buckling. The stripping back of the buffer sleeve prevents the epoxy from contacting it and from wicking into it.

Figure 5:
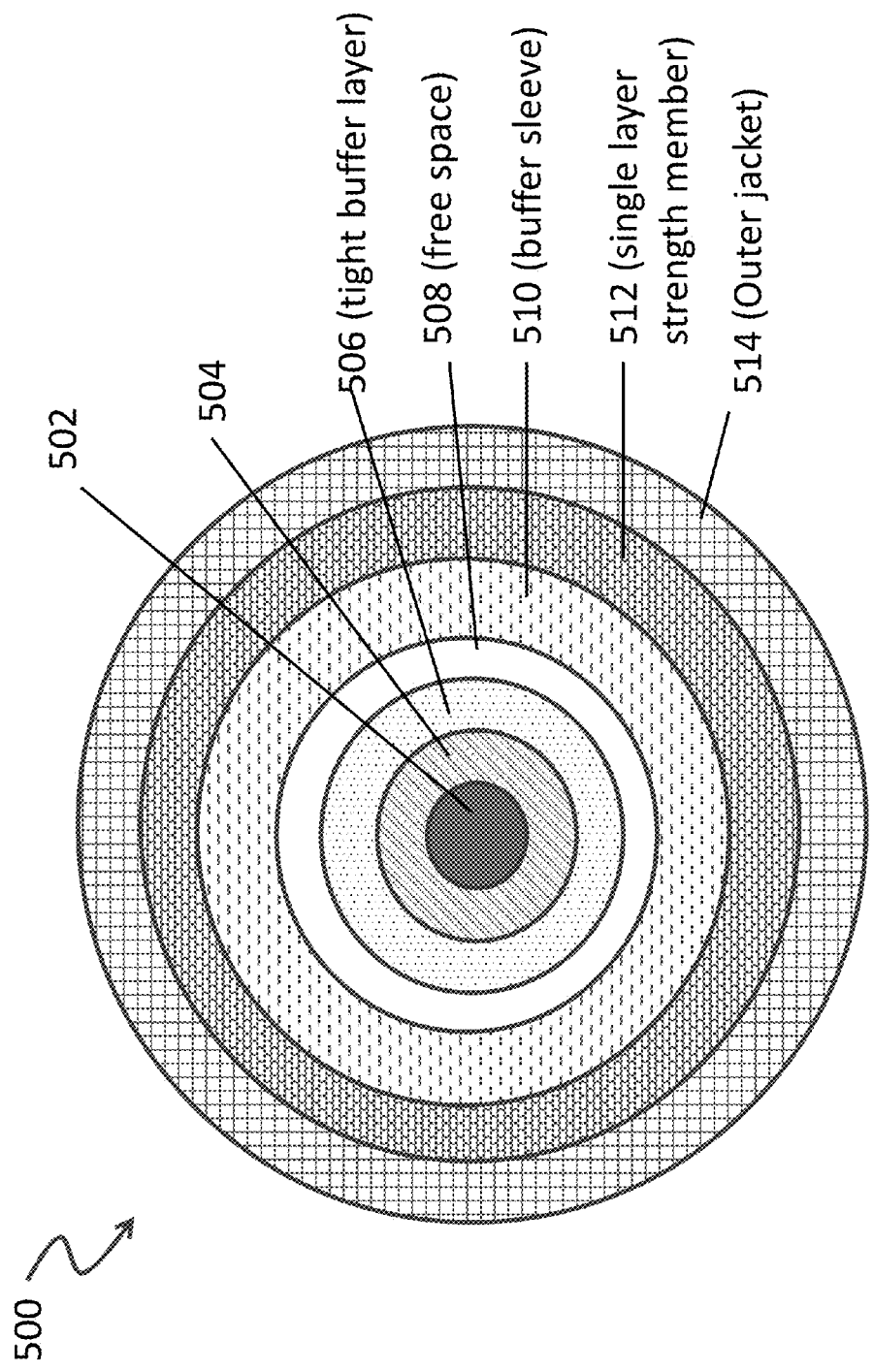
FIG. 5 is a cross-sectional schematic of the disclosed optical cable.

FIG. 5 depicts a cross-section of an optical cable 500 for use in avionics. With reference now to the FIG. 5, the optical cable 500 for use in avionics applications comprises an optical core 502 upon which is disposed an annular first layer of cladding 504. Disposed upon this first layer of cladding 504 is an annular tight buffer layer 506. The optical core 502, the first layer of cladding 504 and the tight buffer layer 506 are collectively referred to herein as the optical fiber.

Figure 1:
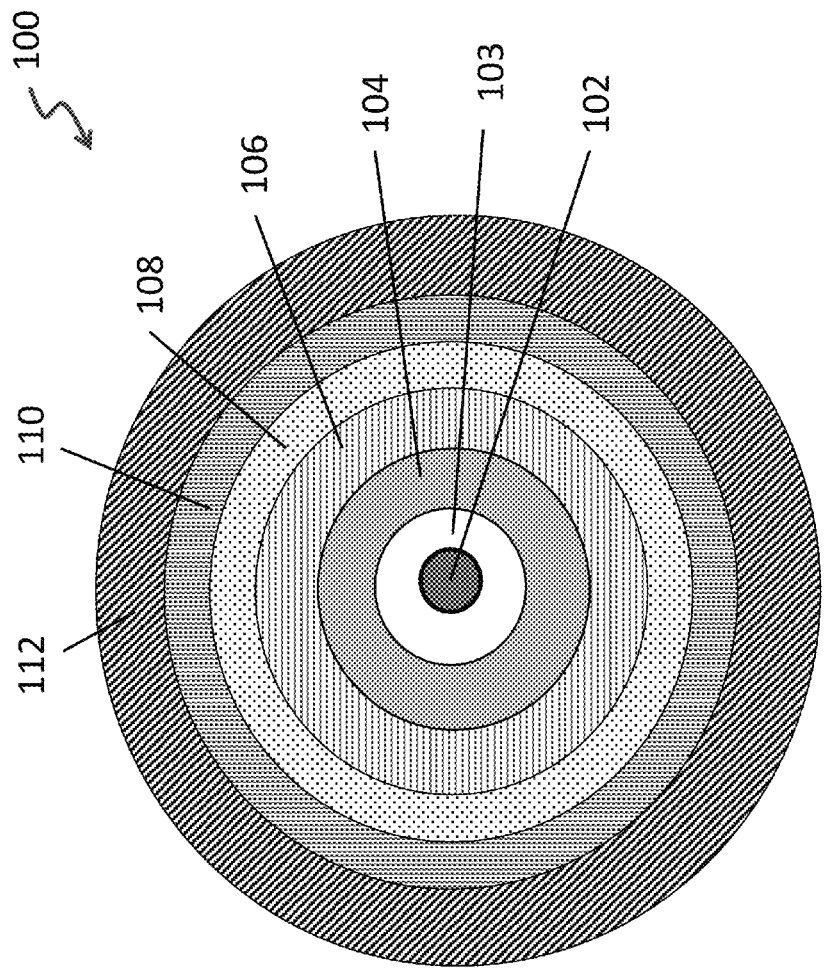
FIG. 1 depicts a cross-section of a cable used in installations where resistance to cable clamping and resistance to cable elongation under load are desirable.
Figure 2:
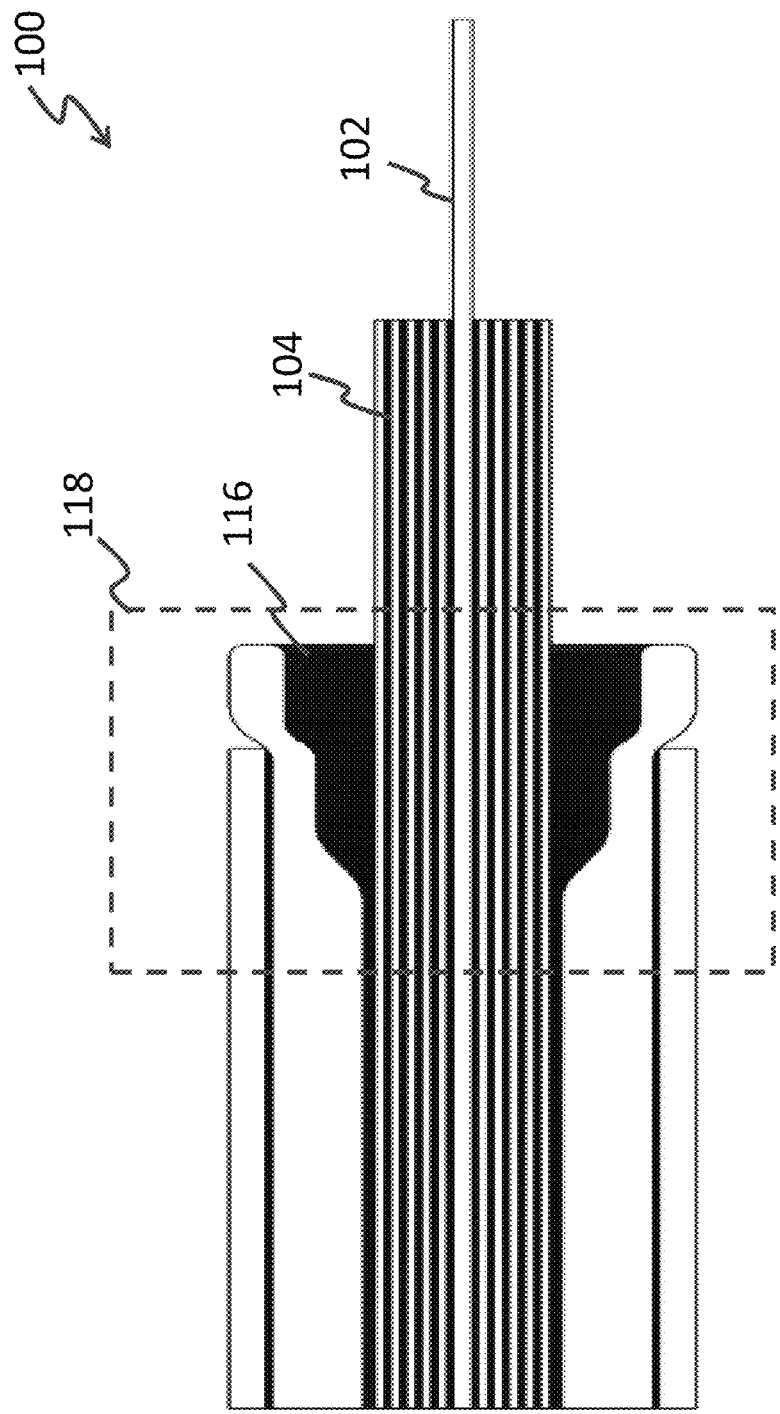
FIG. 2 depicts a side view of a portion of the end of the cable of the FIG. 1 with a pull-proof connector that is used in avionics applications.
Figure 3A:
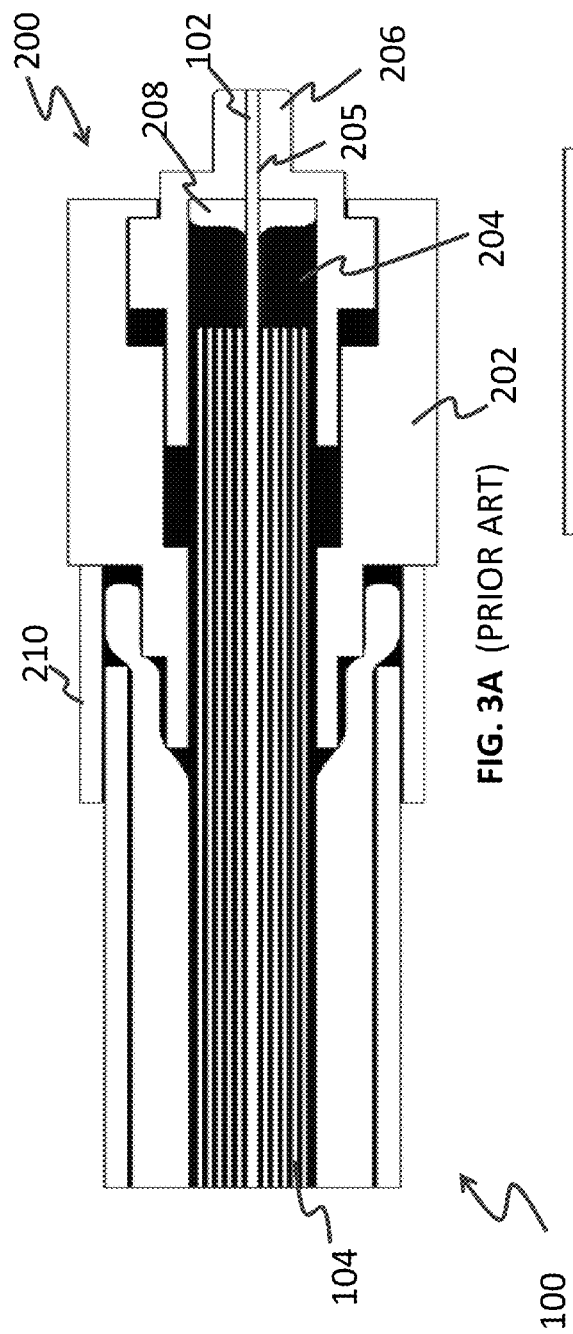
FIG. 3A depicts the ferrule when it is located in the connector plug in the non-compressed position.
Figure 3B:
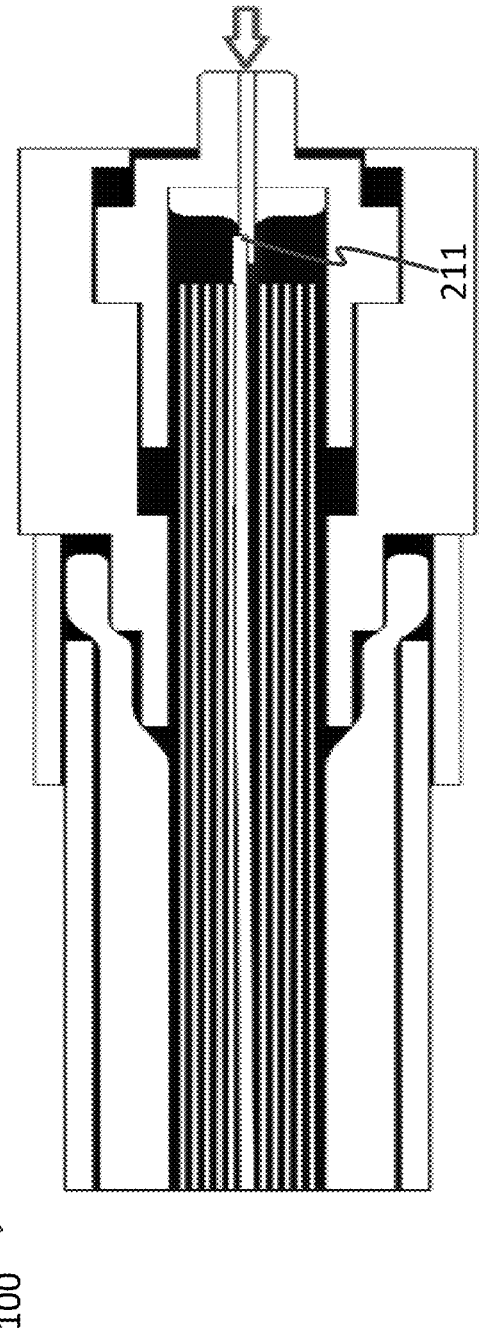
FIG. 3B depicts the ferrule when it is located in the connector plug in the compressed position.

The tight buffer layer 506 with the optical core 502 contained therein is disposed in a crush resistant annular buffer sleeve 510 that provides protection and strength to the optical fiber. Disposed between the tight buffer layer 506 and the buffer sleeve 510 is an annular space 508 that permits the optical fiber to have some flexibility to undergo some amount of displacement when subjected to physical or thermal stresses. Disposed on the buffer sleeve in sequence are an annular first reinforcing layer 512 and an annular outer jacket 514 respectively. The optical cable comprises only a single reinforcing layer and a single annular outer jacket. Most comparative commercially available cables on the other hand contain two reinforcing layers and two jackets as detailed in the FIG. 1. This use of a single reinforcing layer and single jacket facilitates the use of smaller diameter cables. In an embodiment, the disclosed optical cable may have a maximum outer diameter of up to 1.85 millimeters and a weight less than 4.5 kg/km.

In an embodiment, the optical cable 500 may be viewed as comprising an inner portion and an outer portion. The inner portion comprises the optical fiber—notably the optical core 502, the cladding and the tight buffer layer 506. The outer portion comprises annular first reinforcing layer 512 and an annular outer jacket 514. As will be seen in the FIGS. 6, 7 and 8 below, the outer portion is formed into a socket for receiving a connector ferrule.

The optical core 502 is generally a silica core that may be doped with germanium, aluminum and/or phosphorus to increase the refractive index of the core. Boron may be added to the silica core to reduce the refractive index of the core. In addition, the addition of fluorine and/or chlorine to the core minimizes light absorption due to the presence of hydroxyl moieties present in the silica. In an exemplary embodiment, in order to meet the limitations of ARINC 802, the core is a silica core.

The silica core can be single mode with a core size from 5 μm to 10 μm (micrometers) or multimode with a core size from 50 μm to 100 μm with 50 μm to 62.5 μm being often used.

The optical core 502 may have a first layer of cladding 504 that comprises glass cladding or polymer cladding disposed thereon in an annular fashion. In other words, the cladding 504 is concentrically situated with regards to the core 502—they share the same longitudinal axis. Claddings have a lower refractive index than the core and confine the light transmission to the core.

In an embodiment, in order to meet the requirements of ARINC 802, the first layer of cladding 504 is a silica glass cladding that is applied during the fiber draw process at the same time the silica glass core 502 is drawn. The silica glass cladding has a lower index of refraction than the core to assure total internal reflection of the light (optical signal) as it travels through the fiber core. The OD of this cladding is typically 125 μm to 140 μm for an optical fiber with a core size of about 100 μm.

To maintain the pristine properties of silica glass one or more coating layers (not shown) are applied. Examples of suitable polymers that may be used in the coating layers are acrylates, aliphatic polyacrylates, silsesquioxanes, polysiloxanes, vinyl ethers, epoxy polymers, urethane acrylate polymers, or a combination comprising at least one of the foregoing. The polymers are generally crosslinked polymers.

In an exemplary embodiment, the coating layer comprises UV cured acrylates or thermally cured silicones with a diameter over the cladding of 245 μm. Sometimes the coating layer has an outer diameter of 245 to 500 μm.

An optional second layer of cladding (not shown) may be disposed between the first layer of cladding 504 and the tight buffer layer 506. If a second layer of cladding is used, it may have a refractive index that is lower than that of the first layer of cladding 504 and is also situated to be annular with the core as well as the first layer of cladding 504. The same overall cladding diameter ranges apply for a single layer clad as well as a two layer clad.

As may be seen in the FIG. 5, disposed on the first layer of cladding is the tight buffer layer 506. The tight buffer layer 506 is concentrically located on the optical core 502 and is used to encapsulate the optical core 502 along with the cladding 504 for the purpose of providing such functions as mechanical isolation, protection from physical damage and fiber identification. A "tight buffer" comprises a polymer coating in intimate contact with the cladding 504 that is applied to the core during manufacturing. The tight buffer generally comprises water resistant polymers such as fluoropolymers, reinforced polysiloxanes, and polyurethanes. Examples of commercially available materials that are used in the tight buffer are polyvinylidene fluoride (KYNAR®), polytetrafluoroethylene (TEFLON®), thermoplastic polyester elastomer (HYTREL®), polyurethanes, or a combination thereof.

The tight buffer layer 506 is generally applied by methods that include spraying, dipping, extrusion and electrostatic methods. In an embodiment, the tight buffer layer is extruded onto the first layer of cladding 504 by crosshead extrusion, or alternatively, coextruded onto the optical core 502 along with the first cladding layer 504.

The tight buffer is over the coated core and clad optical fiber has an outer diameter of 300 to 1000 micrometers, preferably 400 to 800 micrometers.

A space 508 between the tight buffer layer 506 and the buffer sleeve 510 permits the optical fiber to have some flexibility to undergo displacement when subjected to compressive and/or tensile stresses during connecting with the ferrule.

The buffer sleeve 510 comprises a crush resistant material that increases the crush resistance of the cable during the cable clamping process during installation and in use, while allowing free movement of the tight buffered optical fiber inside it.

In an embodiment, the buffer sleeve 510 is stripped back to a distance that is effective to prevent wicking of the polymeric plug (e.g., the epoxy) from the ferrule to the buffer sleeve. In one embodiment, the buffer sleeve 510 is stripped back to be 10 millimeters or greater from a tip (the closest surface) of the connector ferrule when in the compressed position. In another embodiment, the buffer sleeve 510 is stripped back to be 18 to 20 millimeters from a tip of the connector ferrule when in the compressed position. The tight buffer layer with the optical core disposed therein protrudes much further than the buffer sleeve than in other comparative commercially available optical cables. This is detailed in the figures below. The extended length of the tight buffer layer (relative to the length of the buffer sleeve), provides support to the optical core during its travel through the buffer sleeve when the connector ferrule is compressed, thus preventing buckling of the optical core when subjected to a compressive force in the longitudinal direction. The longitudinal direction (also known as the axial direction) is parallel to the length of the optical core. The term "axially"

is also used to refer to the axial direction. For example, "axially" elongated means that the component is elongated in the axial direction.

It is desirable for the material used in the buffer sleeve 510 to have a melting point that is greater than 130° C., preferably greater than 140° C. and preferably greater than 150° C. The melting point is determined by differential scanning calorimetry at a heating rate of 10° C. to 20° C./minute as per ASTM D 3418. The material has a Vicat softening point as measured according to ASTM D 648 of greater than 90° C., preferably greater than 95° C. and more preferably greater than 98° C. The material displays a thermal stability as measured by thermogravimetric analysis of 330 to 370° C. for a 1 wt % loss in air.

The material displays a tensile modulus at room temperature (23° C.) when strained at a rate of 1 millimeter per minute (as per ASTM D 638) of greater than 900 megapascals (MPa), preferably greater than 1000 MPa and more preferably greater than 1150 MPa. It displays a tensile stress at yield (measured at 23 C and a strain rate of 50 mm/minutes) of 25 to 40 MPa, preferably 28 to 37 MPa and a tensile stress at break (also measured at 23° C. and a strain rate of 50 mm/minutes) of 15 to 45 MPa, preferably 20 to 40 MPa. The material has a notched IZOD impact (measured at 23° C., notched at 4 millimeters thickness as per ASTM D 256) strength of greater than 110 J/m, greater than 115 J/m, and more preferably greater than 120 J/m. The Shore D hardness of a 2 mm thick specimen measured as per ASTM D 2240 is greater than 68, preferably greater than 69 and preferably greater than or equal to 72. The material preferably has a flammability rating of V-0 at a thickness of 1.5 millimeters when measured as per Underwriters Laboratories (UL-94) specification.

In an embodiment, the buffer sleeve 510 may be manufactured from a fluorine containing polymer. Examples of fluorine containing polymers are polyvinyl fluoride (PVF1), polyvinylidene fluoride (PVDF or PVF2), polytetrafluoroethylene (PTFE), polychlorotrifluoroethylene (PCTFE). polyhexafluoropropylene (PHFP), polyperfluoropropylvinylether (PPPVE), polyperfluoromethylvinylether (PMVE), or a combination thereof.

Copolymers of the aforementioned polymers with other non-fluorinated polymers may also be used as the buffer sleeve. Other suitable polymers may include polyolefins, polysiloxanes, polyesters, polyamides, polyamideimides, polyarylates, polyarylsulfones, polyethersulfones, polyphenylene sulfides, polysulfones, polyimides, polyetherimides, polyetherketones, polyether etherketones, polyether ketone ketones, or the like, or a combination thereof. The polymers may contain reinforcing fillers such as glass or carbon fibers, antioxidants, thermal stabilizers, flame retardants, or the like, or a combination thereof.

An exemplary polymer for use in the buffer sleeve 510 is a poly(vinylidene fluoride-co-hexafluoropropylene) (PVDF-HFP) copolymer.

The buffer sleeve 510 has an outer diameter of 800 to 1000 micrometers, preferably 900 to 1000 micrometers.

The annular first reinforcing layer 512 comprises a mix of polyaramid fibers (KEVLAR®) and glass fibers and is in turn surrounded by an annular outer jacket 514. The optical cable 500 has an outer diameter of 1600 to 2000 micrometers, preferably 1700 to 1900 micrometers.

Figure 6:
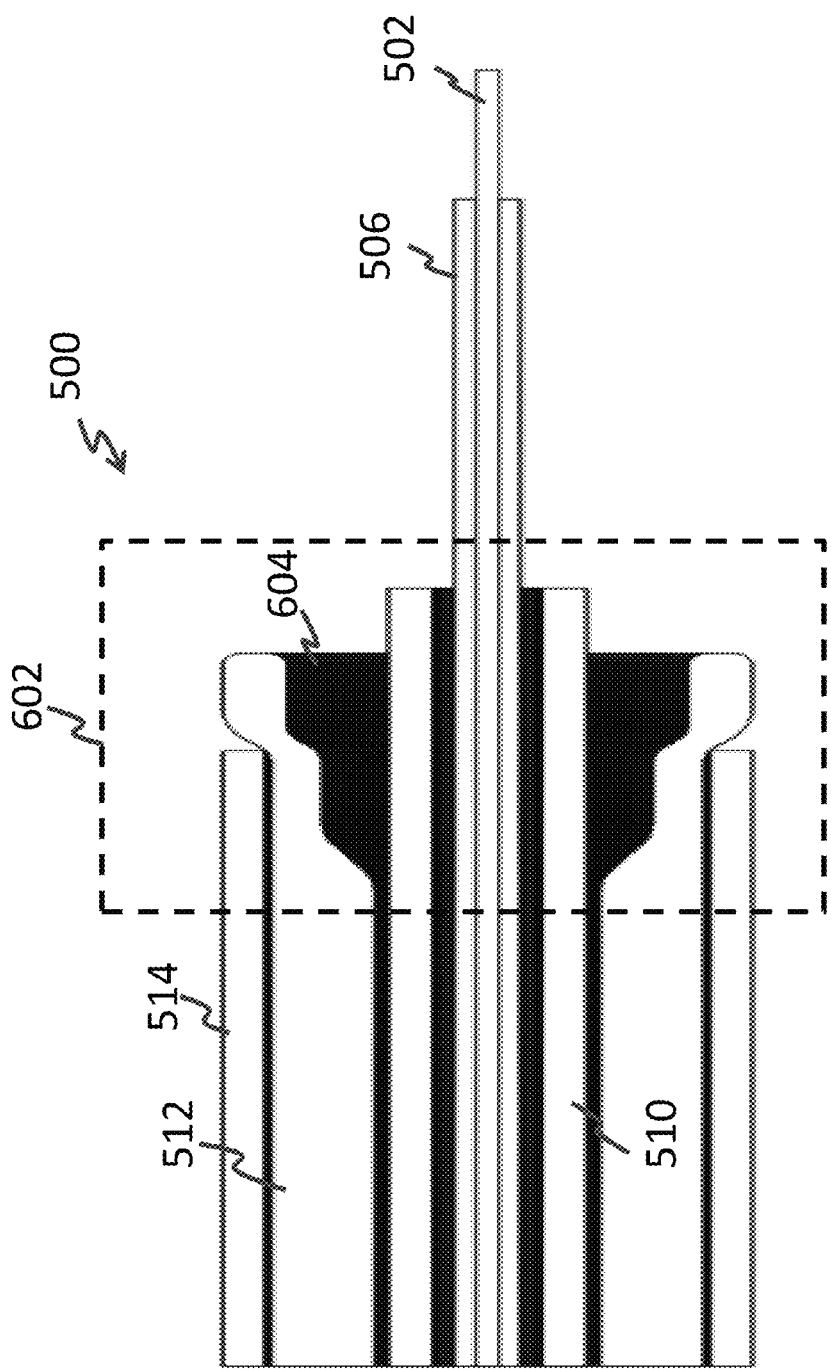
FIG. 6 shows a side view of an end of the optical cable of the FIG. 5 that contacts the ferrule.
Figure 7:
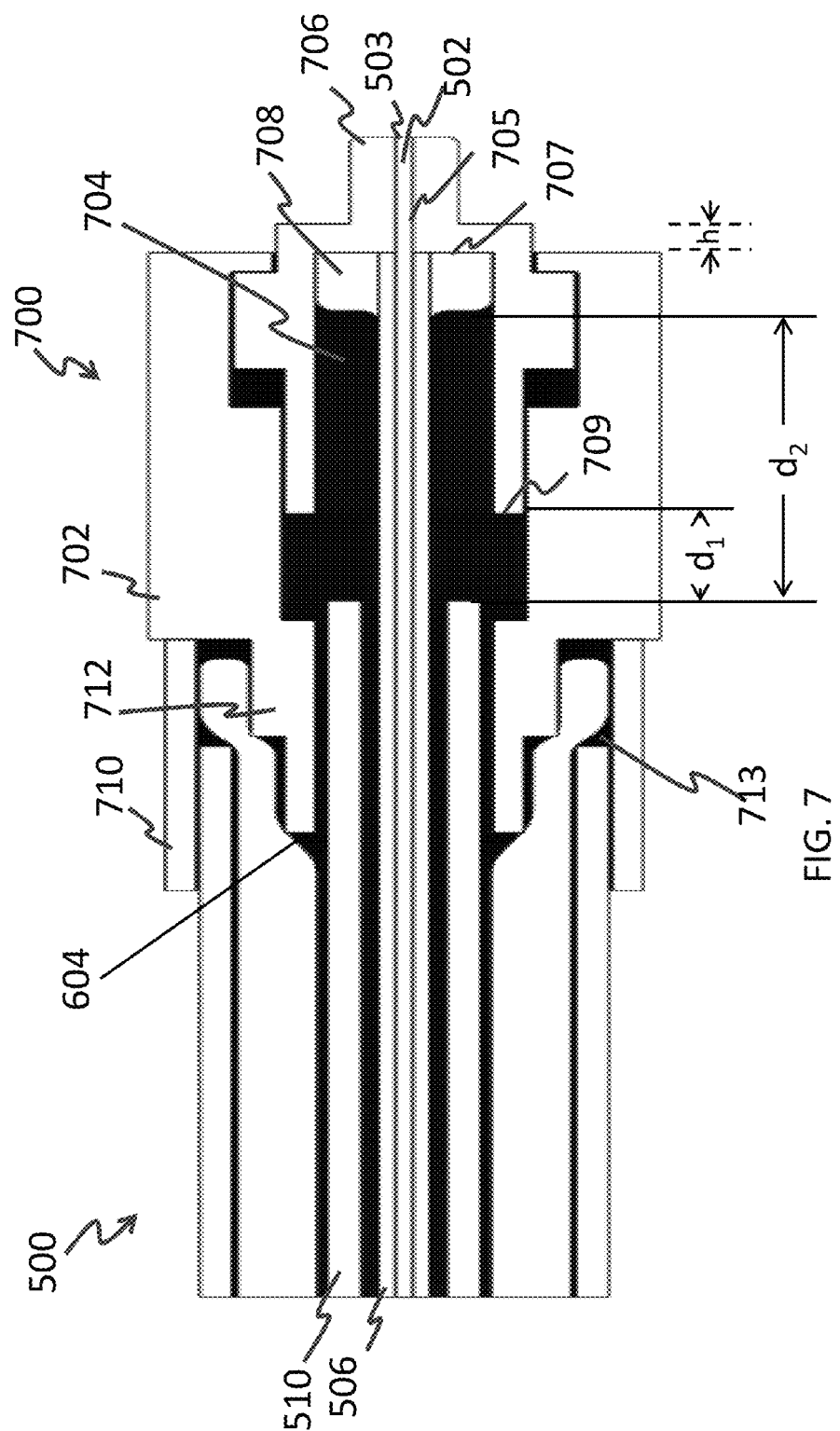
FIG. 7 depicts the optical cable in communication with the connector ferrule when in an uncompressed position.
Figure 8:
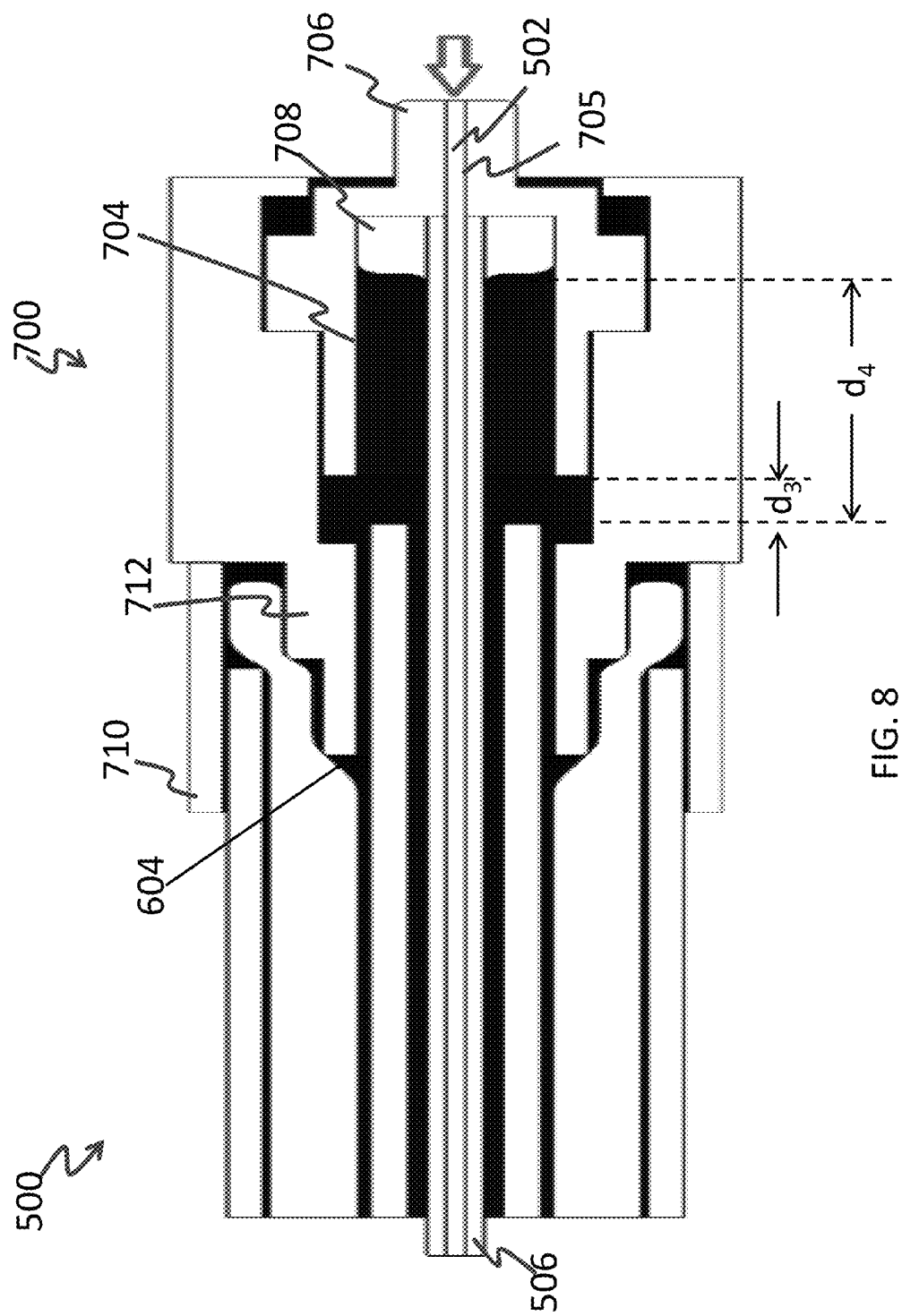
FIG. 8 depicts the optical cable in communication with the connector ferrule when in a compressed position.

The FIGS. 6-8 depict side views of the optical cable 500 of this disclosure with the connector ferrule in the non-compressed position and in the compressed position.

The FIG. 6 shows a side view of an end of the optical cable 500 of the FIG. 5 that contacts the ferrule. The optical cable 500 of the FIG. 6 comprises the optical core 502 upon which is disposed the annular tight buffer layer 506. The tight buffer layer 506 protrudes beyond the buffer sleeve 510. A space 508 between the tight buffer layer 506 and the buffer sleeve 510 permits the tight buffered fiber to retract and flex when subjected to compressive forces. The tight buffered optical fiber is disposed within the buffer sleeve. The buffer sleeve 510 is stripped back to be 18 to 20 millimeters from a tip of the connector ferrule that it contacts after assembly (see FIGS. 7 and 8 below). Disposed on the buffer sleeve in sequence are an annular first reinforcing layer 512 and an annular outer jacket 514 respectively.

In the FIG. 6, the end of the outer portion of the optical cable 500 is shaped in the form of a socket 602 to receive the connector ferrule. The socket 602 depicted by dotted lines comprises a female part 604 which can mate with a male part (a connector plug) of the connector ferrule.

FIG. 7 depicts the optical cable 500 in contact with the connector ferrule 700 when in an uncompressed position. In the uncompressed position, the connector ferrule 700 protrudes outside the head of the plug as seen by the spacing depicted "h".

The connector ferrule 700 shown in the FIG. 7 comprises a connector plug 702 (hereinafter plug 702) that comprises a male protruding part 712 that mates with the female part (the socket) 604 of the optical cable 500. The socket 604 extends in a direction that is opposed to the direction in which the exposed tight buffer layer 506 extends. The plug 702 is annular and comprises an outer sidewall portion 710 that fits around the outer jacket of the optical cable 500. In other words, the plug 702 is an annular tubular plug that includes an outer sidewall portion 710 that surrounds the buffering sleeve 510 and with it forms an annular socket opening 713 that is operative to receive the optical fiber cable 500 having an outer end portion that fits within the annular socket opening 713.

The plug is concentrically located about the buffer sleeve 510. Disposed in the plug 702 is the ferrule 706 that contains a first hollow portion 704 (also called the central opening). The plug 702 taken together with the ferrule 706 form the connector ferrule 700. The connector ferrule 700 is comprised of ceramic. As can be seen in the FIG. 7, the buffer sleeve 510 does not contact the tip of the ferrule but is disposed a distance $d_1$ from it. An epoxy plug 708 located in the first hollow portion 704 is located at a distance $d_2$ from an end of the buffer sleeve 510. The distance $d_2$ is greater than $d_1$. The distance $d_1$ varies from 22 to 26 millimeters prior to the compression.

The spacing of the buffer sleeve 510 at a distance of 10 to 30 millimeters and the retention of the epoxy plug 708 at an even greater distance from the buffer sleeve 510 prevents the epoxy from wicking into the buffer sleeve when the ferrule 706 is pressed into the plug 702.

The ferrule comprises a first end 709 and a second end 707 that are opposedly disposed to each other. The second end 707 is also referred to as an inner surface of the ferrule. The first end has a central opening that receives the exposed tight buffer layer 506 with the coated optical core 502 disposed therein. The second end has a polymeric plug that contacts the tight buffer layer 506 of the optical fiber. In an embodiment, the polymeric plug is an epoxy plug. The second end of the ferrule has an opening for securing the optical core (stripped of the tight buffer layer 506) 502. As may be seen in the FIG. 7, an exposed portion of the optical core 502 includes a cleaved outer end 503 that is substantially flush with an outer end of the ferrule 706. The tight buffer layer 506 is cleaved to be flush with an inner surface 707 of the ferrule 706.

As can be seen in the FIG. 7, the stripped tight buffer layer 506 extends from the optical cable and protrudes from the buffer sleeve into the epoxy plug 708. The epoxy plug 708 encapsulates the optical fiber at the point that it enters the second hollow portion of the ferrule that accommodates the coated optical core 502. The epoxy plug 208 behaves as a sealant. The support provided by the tight buffer layer 506 to the coated optical core 502 as it protrudes from the buffer sleeve 510 and contacts the epoxy plug prevents the optical core from buckling when the ferrule 706 is depressed into the plug 702. A central hole 705 in the ferrule accommodates and secures the coated optical core 502 of the optical fiber.

In the compressed position depicted in the FIG. 8, the ferrule 706 is pressed into the plug 702 along the longitudinal direction as shown by the arrow in the figure. The distance $d_3$ from the buffer sleeve to a closest tip of the ferrule is 18 to 20 millimeters. During the pressing of the ferrule 702 into the plug 702, the support provided by the tight buffer layer 506 prevents the optical core 502 from buckling. The tight buffered fiber is supported by the tight buffer layer 506 and free to slide inside the buffer sleeve tube.

The distance $d_4$ between the epoxy plug 708 and the closest point on the buffer sleeve 510 prevents the epoxy from wicking into the buffer sleeve. This configuration is advantageous because the strength member yarns of the first reinforcing layer 512 (See FIG. 5) do not collapse on to the optical fiber directly any more when the cable is stretched as the buffer sleeve isolates the tight buffered fiber from its surrounding, thereby allowing the cable to meet the Finished Cable Tensile Strength and Elongation specification requirements of ARINC 802. Further, the crush resistance of the buffer sleeve isolates the tight buffered fiber from radial compressive forces on the cable and allows the finished cable to meet the Cable Clamping specification of ARINC 802.

The outer diameter of the buffer sleeve allows the sleeve to fit precisely within the shell of the plug 702, thus assuring the aramid/glass strength member yarns stay between the connector back shell and the crimp ring, as seen in FIG. 8. By keeping the buffer sleeve back (away from the tip of the connector) within the connector shell body, away from the point at which the optical fiber is bonded to the ferrule, epoxy cannot wick into the tight buffer layer 506 and/or the buffer sleeve 510, thus eliminating the unintended bond between the optical cable and the connector ferrule.

In one embodiment, a method of manufacturing the optical cable comprises a method that includes disposing in a buffer sleeve an optical fiber that is operative to transmit light. The buffer sleeve comprises an inner portion that contains the buffered optical fiber and an outer portion that comprises a reinforcing layer; where the reinforcing layer is formed into a socket at the end of the connector body and crimped together with the outer jacket to the connector shell body by way of a crimp ring thus anchoring the finished cable to the connector.

A portion of the buffer sleeve is trimmed to expose a portion of a tight buffer layer that is disposed on an optical core. The ferrule connector comprising an annular tubular plug and a ferrule is disposed in the socket such that the protruding portion of the annular tubular plug mates with the socket. As detailed above, the annular tubular plug and the ferrule each have a central opening to accommodate the exposed portion of the tight buffer layer; where the tight buffer layer extends axially outwards from the buffer sleeve to an inner surface of the ferrule and where the optical core is secured by the ferrule. The ferrule is then pressed into the annular tubular plug. After the compression, the end portion of the trimmed buffer sleeve is located at a distance of 10 millimeters or greater from a nearest surface of the ferrule. In an embodiment, after compression, the end portion of the trimmed buffer sleeve is located at a distance of 18 to 20 millimeters or greater from a nearest surface of the ferrule.

This invention is exemplified by the following non-limiting examples.

EXAMPLE

Example 1

Figure 9:
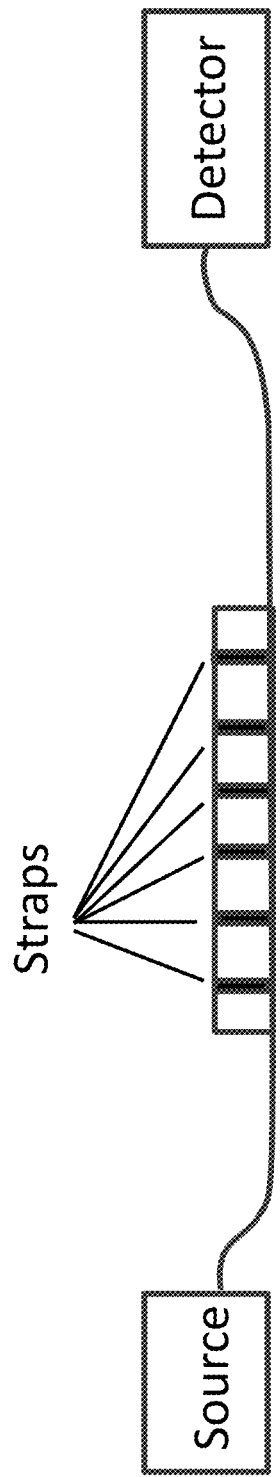
FIG. 9 depicts the experimental set-up for measuring cable performance.

This example was conducted to determine the ability of the cable to be clamped during installation on aircraft using self-clinching nylon straps over the cable, then tightening using the proper installation tool with a tension setting of #1 as defined in the Cable Clamping test in ARINC 802. The cable is clamped to a 13±1 mm mandrel. A total of six straps are applied to the cable, spaced 90 mm apart. The cable test specimen is 4 meters long. The Cable Clamping test setup is shown in FIG. 9. A maximum change in attenuation of 0.05 dB is allowed by the ARINC 802 specification. The optical cable under test exhibited 0.00 dB change in attenuation at 850 nm and 1300 nm.

Example 2

Figure 10:
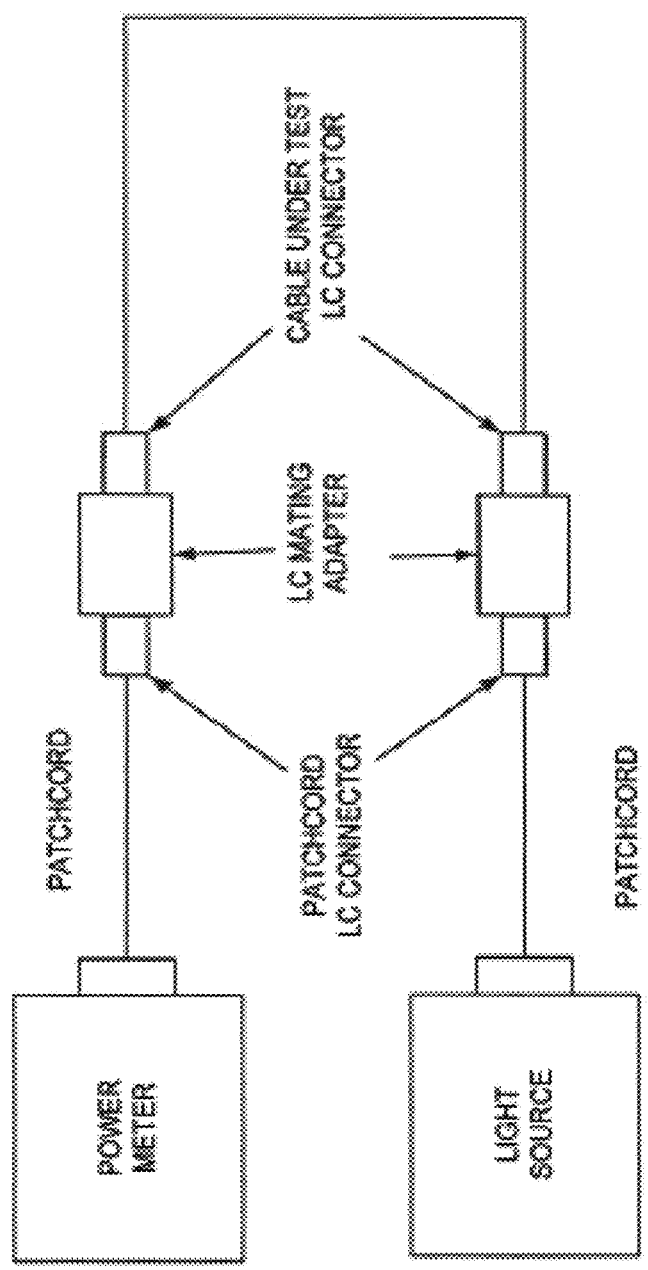
FIG. 10 depicts the fiber movement under compression test setup.

This example was conducted to determine fiber movement under connector compression as required by the ARINC 802 specification requirement "Fiber Movement under Compression". Two patch cords with LC connectors on either end are used. One patch cord connects the Light Source to an LC mating adapter and the other from another LC mating adapter to an optical power meter. A 5 meter long test cable terminated with LC connectors on each end completes the connection with the LC mating adapters between the light source and the optical power meter. The Fiber Movement Under Compression test setup is shown in FIG. 10.

Figure 11:
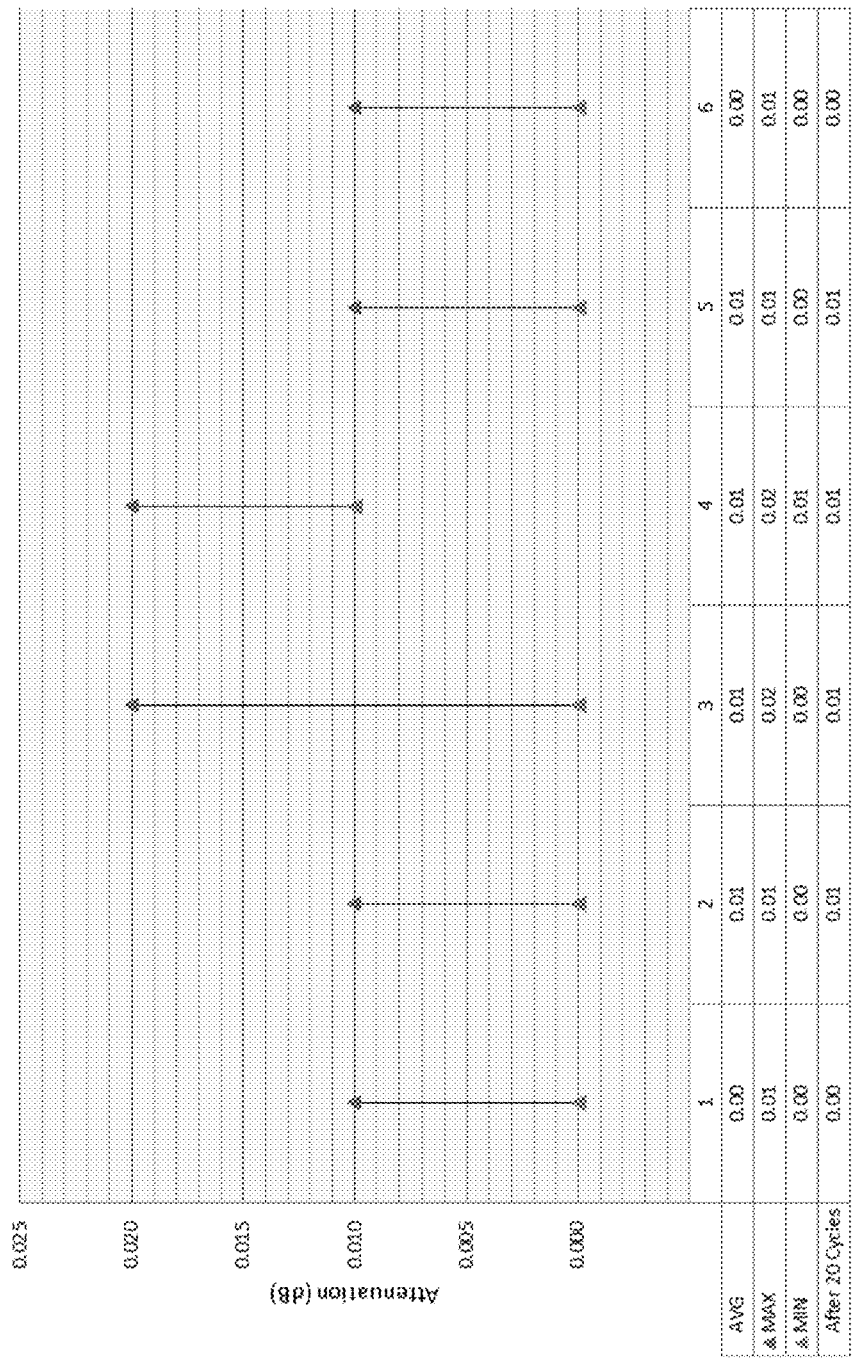
FIG. 11 is a graph with an associated table that shows the maximum allowable change at 850 nm.
Figure 12:
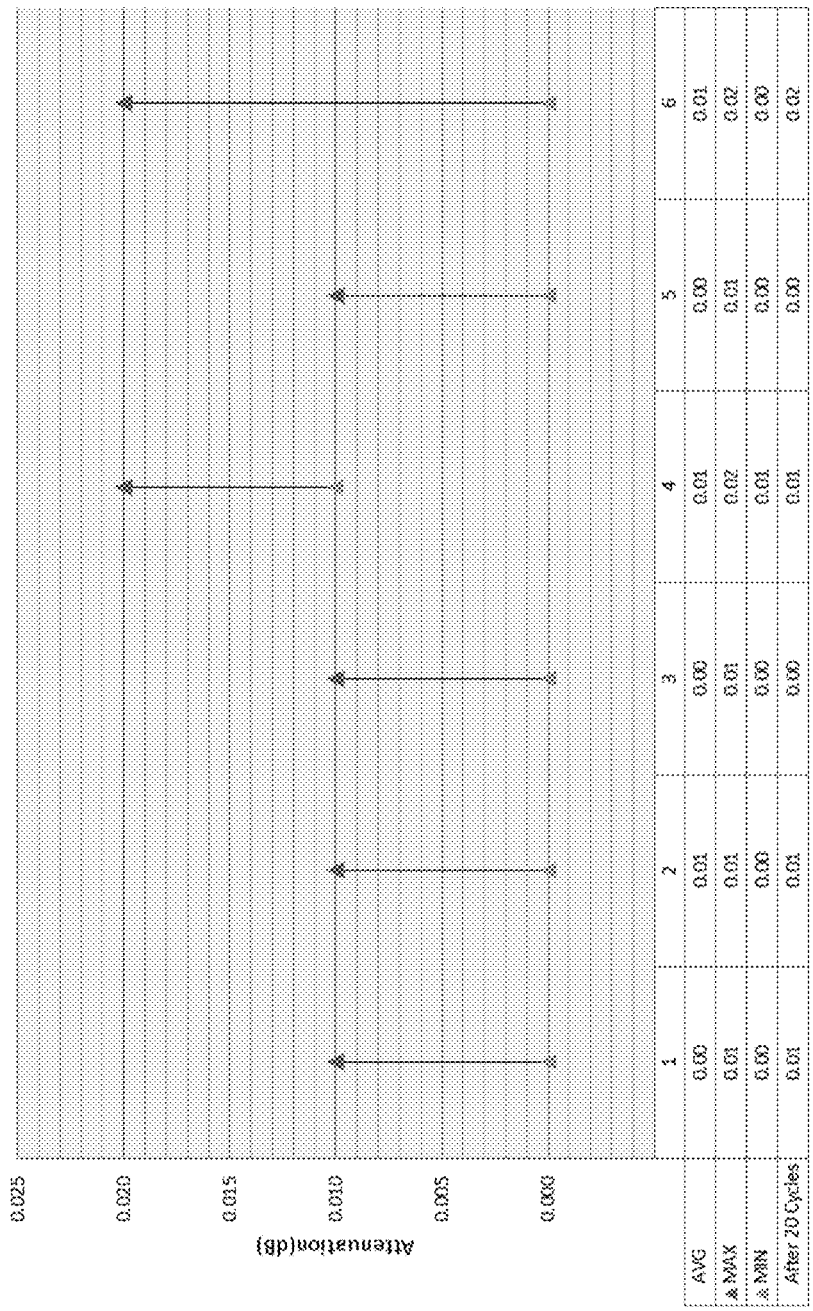
FIG. 12 is a graph with an associated table that shows the maximum allowable change at 1100 nm.

Each terminated connector is compressed to an initial stetting of 0.5 mm and the power meter zeroed. Each termination is manually compressed from 0.5 to 1.5 mm for a total of 20 times. The maximum allowable change in transmittance after 20 cycles should not exceed 0.10 dB when measured at 850 nm and 1300 nm. Six (6) specimens were tested. The maximum change during and after completion of 20 cycles was 0.02 dB at 850 nm and 1300 nm shown in FIG. 11 and FIG. 12.

It is to be noted that all ranges detailed herein include the endpoints. Numerical values from different ranges are combinable.

The transition term comprising encompasses the transition terms "consisting of" and "consisting essentially of".

The term "and/or" includes both "and" as well as "or". For example, "A and/or B" is interpreted to be A, B, or A and B.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. An optical cable connection comprising:
   a buffer sleeve having an inner portion and an outer portion; where the inner portion comprises an optical core that is operative to transmit light; and
   a tight buffer layer disposed on the optical core; where the buffer sleeve is trimmed back at its end to provide an exposed protruding length of the tight buffer layer with the optical core included therein;
   where the outer portion of the buffer sleeve is configured to form a socket that is operative to receive a connector ferrule; where the outer portion of the buffer sleeve comprises a first reinforcing layer that comprises polyaramid and glass fibrous reinforcement;
   where the connector ferrule comprises
   an annular tubular plug having a center opening; where the annular tubular plug mates with the socket formed in the outer portion of the buffer sleeve;
   a ferrule seated in the plug; the ferrule having a first end and a second end; where the first end receives the exposed protruding length of the tight buffer layer that extends axially outwardly from the buffer sleeve into the center opening of the ferrule; where the second end has a center opening that receives the optical core; and
   a polymeric plug that is disposed at the second end of the plug and that surrounds the tight buffer layer at a point that it contacts the ferrule; where a distance between the polymeric plug and the buffer sleeve is selected so as to prevent wicking of a polymer from the polymeric plug into the buffer sleeve;
   where a closest end of the buffer sleeve is separated from the first end of the ferrule by a distance of 10 millimeters or greater.

2. The optical cable connection of claim 1, further comprising an outer jacket that is disposed on the first reinforcing layer.

3. The optical cable connection of claim 1, where the first reinforcing layer that comprises a polyaramid and glass fibrous reinforcement is the only reinforcing layer contained in the cable.

4. The optical cable connection of claim 2, where the outer jacket is the only jacket and is in direct contact with the first reinforcing layer and has an outer diameter of up to 1.8±0.1 millimeter.

5. The optical cable connection of claim 1, where the polymeric plug comprises an epoxy resin and where the ferrule comprises a ceramic.

6. The optical cable connection of claim 1, where the exposed protruding length of the tight buffer layer extends in a direction that is opposed to a direction in which the socket extends.

7. The optical cable connection of claim 1, where an exposed portion of the optical fiber includes a cleaved outer end that is substantially flush with an outer end of the ferrule.

8. The optical cable connection of claim 1, where the exposed protruding length of the tight buffer layer includes a cleaved outer end that is substantially flush with an inner end of the ferrule.

9. The optical cable connection of claim 1, where the distance of 18 to 20 millimeters between the buffer sleeve and the first end of the ferrule occurs after pressing of the ferrule into the annular tubular plug.

10. The optical cable connection of claim 1, wherein the where the annular tubular plug includes a protrusion that mates with the socket formed in the outer portion of the buffer sleeve.

11. The optical fiber connection claim 1, wherein the socket extends axially inwardly of the outer portion of the buffer sleeve and where the annular tubular plug includes an outer sidewall portion that surrounds the buffering sleeve and with it forms an annular socket opening, that is operative to receive the buffer sleeve.

12. The optical fiber connection claim 1, where the exposed protruding length of the tight buffer layer that surrounds the optical core prevents buckling of the optical core.

13. The optical fiber connection claim 1, where the buffer sleeve comprises a fluoropolymer.

14. The optical fiber connection claim 13, where the fluoropolymer comprises a poly(vinylidene fluoride-co-hexafluoropropylene).

15. The optical fiber connection claim 1, where the distance from the closest end of the buffer sleeve to the first end of the ferrule is 18 to 20 millimeters.

16. A method comprising:
    disposing in a buffer sleeve an optical fiber that is operative to transmit light; where the buffer sleeve comprises an inner portion that contains the optical fiber and an outer portion that comprises a first reinforcing layer; where the first reinforcing layer is formed into a socket at an end of the buffer sleeve;
    trimming a portion of the buffer sleeve to expose a portion of a tight buffer layer that is disposed on an optical core;
    disposing a ferrule connector comprising an annular tubular plug and a ferrule such that a protruding portion of the annular tubular plug mates with the socket; the annular tubular plug and the ferrule each having a central opening to accommodate the exposed portion of the tight buffer layer; where the tight buffer layer extends axially outwards from the buffer sleeve to an inner surface of the ferrule and where the optical core is secured by the ferrule;
    pressing the connector ferrule into the annular tubular plug where an end portion of the trimmed buffer sleeve is located at a distance of 10 millimeters or greater from a nearest surface of the ferrule; and
    disposing a polymeric plug in the ferrule so that the polymeric plug contacts a surface of the tight buffer layer and a distance between the polymeric plug and the buffer sleeve is selected so as to prevent wicking of a polymer from the polymeric plug into the buffer sleeve.

17. The method of claim 16, where the distance from the end portion of the trimmed buffer sleeve to a nearest surface of the ferrule is 18 to 20 millimeters.

* * * * *